(12) United States Patent
Ode

(10) Patent No.: US 9,523,907 B2
(45) Date of Patent: Dec. 20, 2016

(54) ZOOM OPTICAL SYSTEM AND IMAGE PROJECTION APPARATUS HAVING THE SAME

(71) Applicant: CANON KABUSHIKI KAISHA, Tokyo (JP)

(72) Inventor: Takashi Ode, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/624,403

(22) Filed: Feb. 17, 2015

(65) Prior Publication Data

US 2015/0234167 A1   Aug. 20, 2015

(30) Foreign Application Priority Data

Feb. 19, 2014 (JP) ................................ 2014-029397

(51) Int. Cl.
| | |
|---|---|
| G02B 15/20 | (2006.01) |
| G03B 21/14 | (2006.01) |
| G02B 13/16 | (2006.01) |
| G02B 15/14 | (2006.01) |

(52) U.S. Cl.
CPC ............ G03B 21/142 (2013.01); G02B 13/16 (2013.01); G02B 15/14 (2013.01)

(58) Field of Classification Search
CPC ....... G03B 21/142; G02B 13/16; G02B 15/14; G02B 15/163; G02B 15/167; G02B 15/20; G02B 23/14
See application file for complete search history.

(56) References Cited

U.S. PATENT DOCUMENTS

| | | | |
|---|---|---|---|
| 6,304,389 B1 * | 10/2001 | Shibayama | G02B 15/177 359/676 |
| 7,283,309 B2 | 10/2007 | Caldwell | |
| 7,791,816 B2 | 9/2010 | Cho | |
| 2002/0060858 A1 * | 5/2002 | Wada | G02B 13/16 359/739 |
| 2003/0103266 A1 * | 6/2003 | Wada | G02B 13/16 359/649 |
| 2005/0078281 A1 * | 4/2005 | Hatakeyama | G02B 15/14 353/69 |
| 2006/0056051 A1 * | 3/2006 | Hakko | G02B 15/163 359/686 |
| 2013/0148009 A1 * | 6/2013 | Miyatani | H04N 5/23212 348/347 |
| 2013/0321681 A1 * | 12/2013 | Sakai | G02B 15/14 348/294 |
| 2014/0204351 A1 | 7/2014 | Matsuo | |

* cited by examiner

*Primary Examiner* — Frank Font
(74) *Attorney, Agent, or Firm* — Canon USA Inc., IP Division

(57) ABSTRACT

A zoom optical system includes, in order from an enlargement conjugate side to a reduction conjugate side, a first optical group, and a second optical group having a zoom function. The second optical group includes, in order from the enlargement conjugate side to the reduction conjugate side, a lens unit B21 with positive refractive power, a lens unit B22 with positive refractive power, and a lens unit B23 with positive refractive power. The lens units B21 and B22 move with a distance therebetween changed at the time of zooming. A predetermined relationship between a focal length fR of the second optical group in a wide-angle end and a focal length fB22 of the lens unit B22 is satisfied.

10 Claims, 10 Drawing Sheets

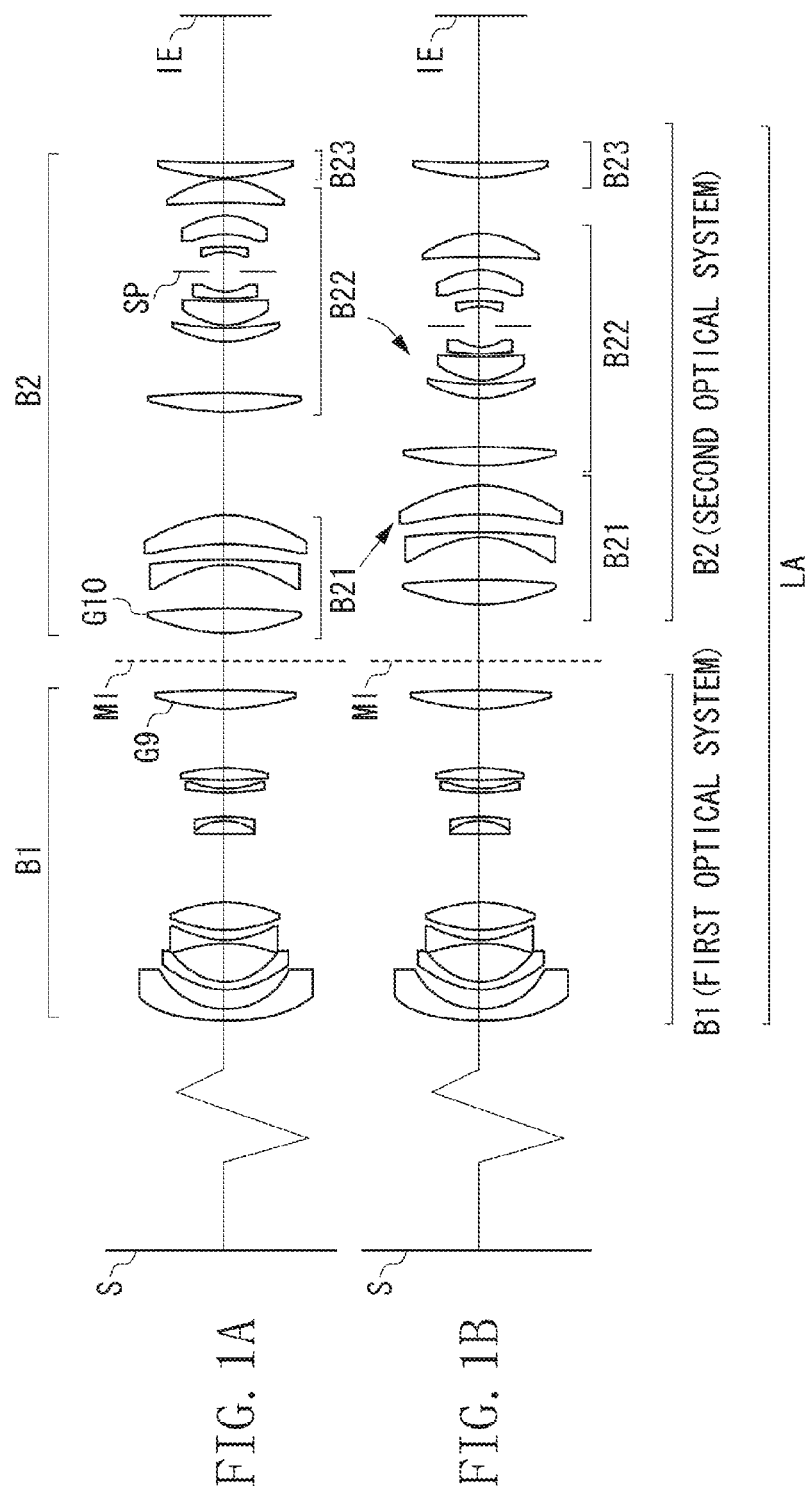

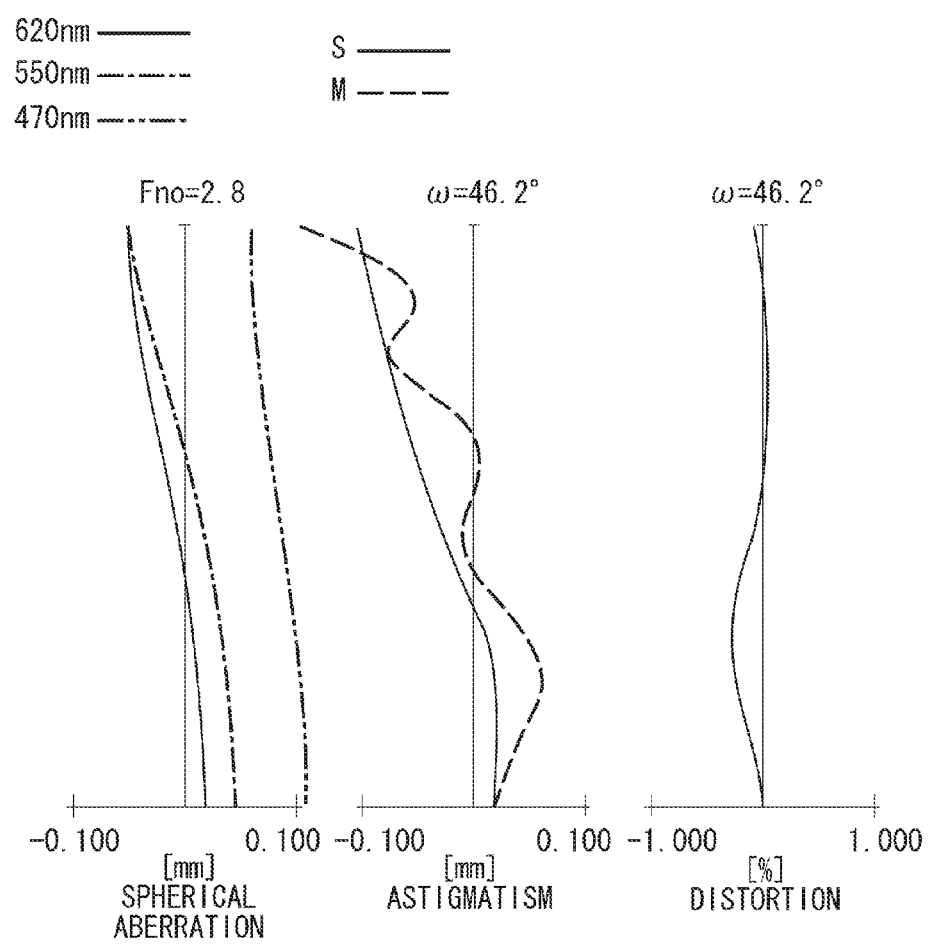

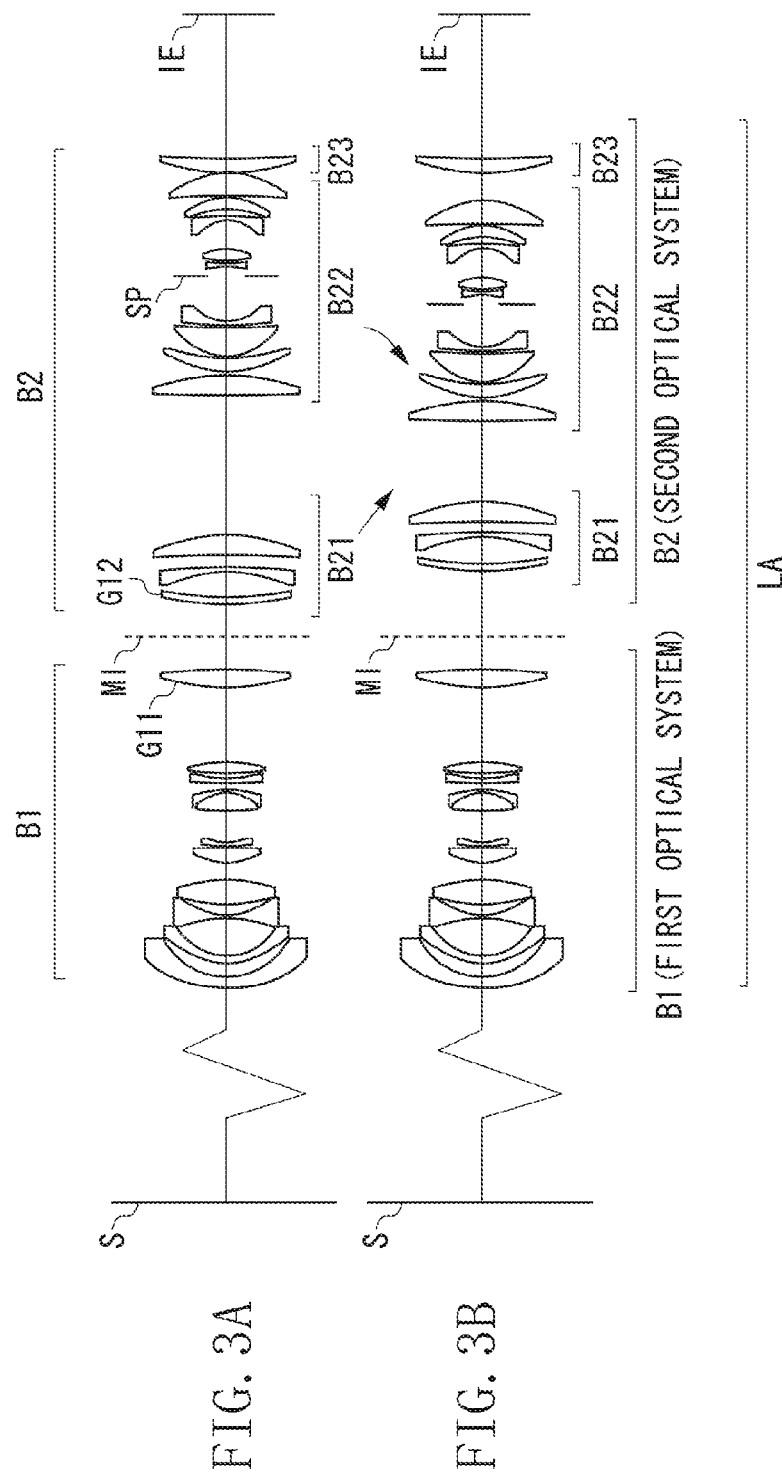

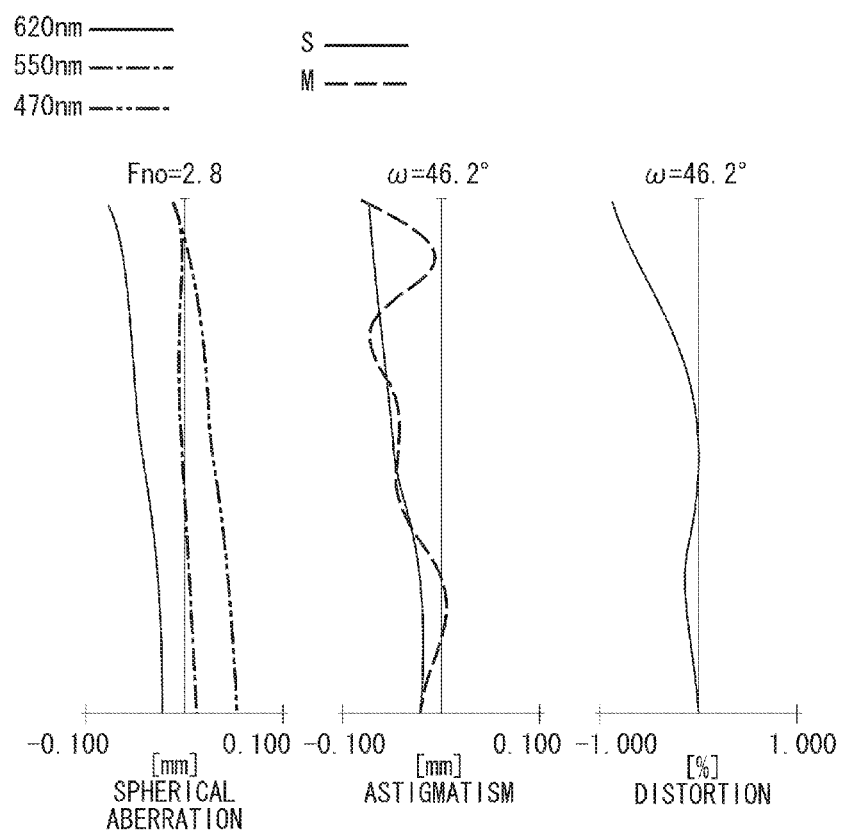

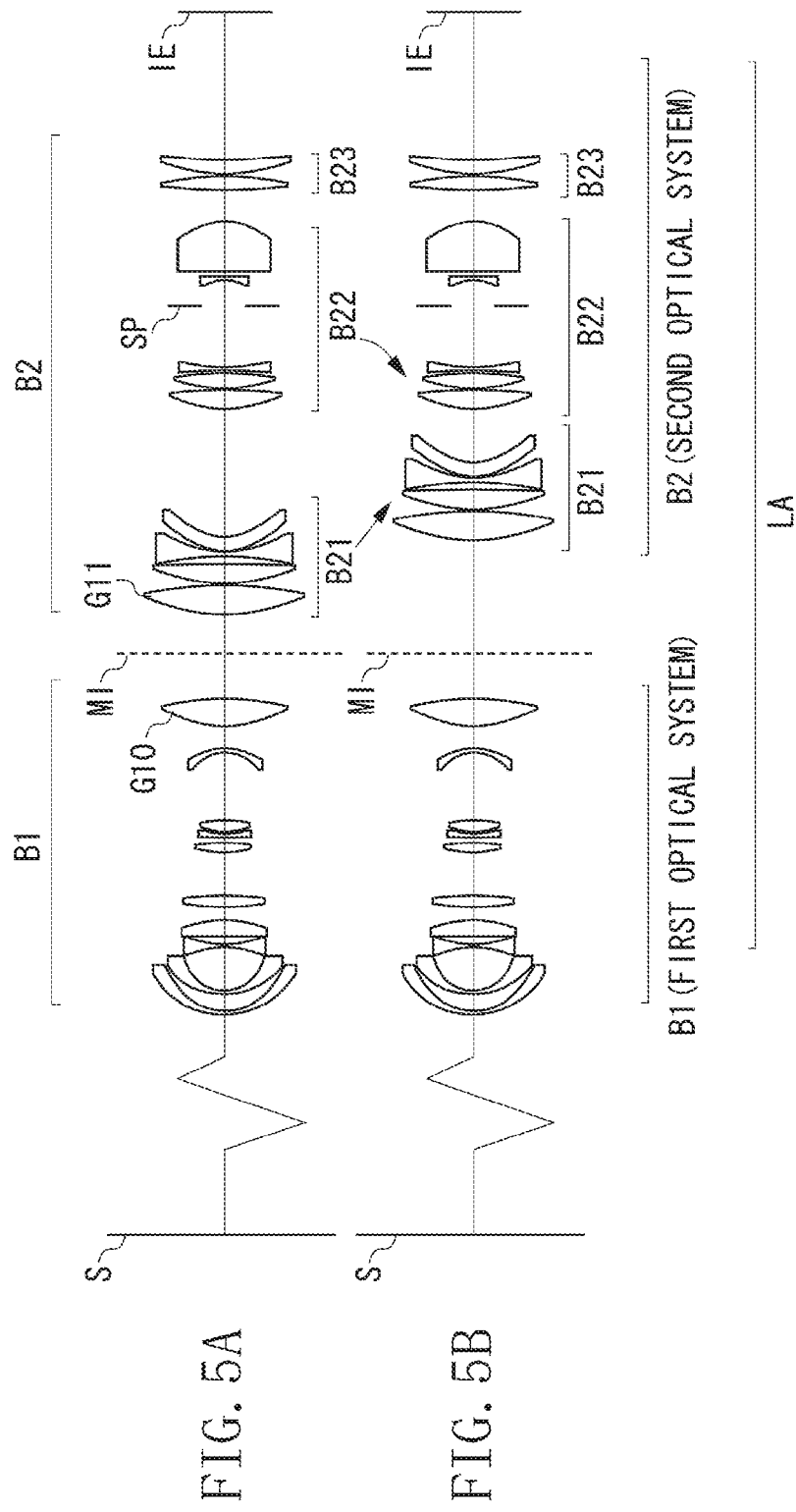

ZOOM OPTICAL SYSTEM AND IMAGE PROJECTION APPARATUS HAVING THE SAME

BACKGROUND OF THE INVENTION

Field of the Invention

The present invention relates to a zoom optical system having an optical action that forms an image of a light flux emitted from one point on an enlargement conjugate side, in an intermediate imaging position, and then re-forms an image on a reduction conjugate side, and an image projection apparatus having the zoom optical system.

Description of the Related Art

Recently, a zoom optical system used in an imaging apparatus such as a digital camera or an image projection apparatus such as a projector has been required to reduce the size of an entire zoom lens, and have a wide angle of view and high precision optical performance over an entire zoom range. As the zoom optical system that satisfies these requirements, there is a zoom optical system employing an intermediate imaging technique (re-imaging method). In the intermediate imaging method, when an image of an enlargement conjugation point (object point) on an enlargement conjugate side (object side) is formed on a reduction conjugate side (image side), the image of the enlargement conjugation point is formed once in an intermediate imaging position in the zoom optical system, and then the image is re-formed in a reduction conjugation point (see U.S. Pat. No. 7,283,309, U.S. Pat. No. 7,791,816, and US2014/204351).

U.S. Pat. No. 7,283,309 discusses a zoom lens system configured to form a first intermediate real image of an object by a first zoom group, and form a final image based on the first intermediate real image by a second zoom group.

U.S. Pat. No. 7,791,816 discusses a zoom lens configured to form a primary image of an object by a first lens group, and re-form the primary image on an imaging surface by a relay lens having a zoom function. The relay lens in U.S. Pat. No. 7,791,816 includes, in order from an object side to an image side, an R1 unit with positive refractive power, an R2 unit with positive refractive power, and an R3 unit with negative refractive power, and performs a zoom operation by moving the R1 unit and the R2 unit.

US2014/204351 discusses a projection optical system used in a projector apparatus and including a first refractive optical system having a zoom function and configured to form on an enlargement side a first intermediate image of an incident light from a reduction side, and a second refractive optical system configured to form an image of the first intermediate image as a second intermediate image on the enlargement side. Furthermore, the projection optical system includes a first reflective optical system with positive refractive power and projects the second intermediate image to a screen on the enlargement side. The first refractive optical system includes a first lens group G1 with positive refractive power, a second lens group G2 with positive refractive power, and a third lens group G3 with positive refractive power, and performs a zooming operation by moving the first lens group G1 and the second lens group G2.

When the re-imaging method is used in the zoom optical system, a viewing angle (angle of view) can be easily widened, and the size of the entire zoom lens can be easily reduced. Especially, when the re-imaging method is used in the zoom optical system (imaging optical system) used in the image projection apparatus (projector) which magnifies and projects an image provided by a liquid crystal display (LCD) element, on a screen surface, the size of the entire zoom lens can be reduced, and the image can be projected with a large projection angle. However, according to the zoom optical system using the re-imaging method, despite the above characteristics, the aberration considerably varies at the time of zooming, and it is difficult to obtain high optical performance over an entire zoom range.

Especially, when the viewing angle is widened, aberrations such as image distortion and excessive curvature of field considerably vary at the time of zooming. Therefore, in the zoom optical system using the re-imaging method, it is important to appropriately set a lens configuration, the number of lenses (or lens groups) moving at the time of zooming, the refractive power of each lens group, a moving condition, and an intermediate imaging position in a light path. When these parameters are not appropriately set, the aberration variation is increased at the time of zooming, it is difficult to reduce the size of the zoom lens, the viewing angle cannot be widened, and high optical performance over the entire zoom range cannot be obtained.

U.S. Pat. No. 7,283,309 discusses a zoom lens having five moving lens groups in which lens groups moving at the time of zooming are provided in each of a first zoom group and a second zoom group. When the zooming operation is performed using the first zoom group, the aberration and the curvature of field are likely to considerably change in a wide-angle end and a telephoto end.

In the zoom lens discussed in U.S. Pat. No. 7,791,816, only two lens groups move at the time of zooming in a relay lens, and the number of the movable lens groups is small. However, the positive refractive power of each of the two lens groups is strong, so that the aberration is likely to considerably vary at the time of zooming. Furthermore, the zoom lens does not form a telecentric optical system on the image side, so that it is difficult to apply the zoom lens to a projector or the like.

According to US2014/204351, while the zooming operation is performed by moving two lens groups each having positive refractive power, the aberration is likely to considerably vary at the time of zooming.

SUMMARY OF THE INVENTION

According to an aspect of the present invention, a zoom optical system includes, in order from an enlargement conjugate side to a reduction conjugate side, a first optical group, and a second optical group having a zoom function, in which the zoom optical system has an optical action to form an image of an enlargement conjugation point of the enlargement conjugate side, in an intermediate imaging position between the first optical group and the second optical group, and to re-form the image formed in the intermediate imaging position, in a reduction conjugation point on the reduction conjugate side, the second optical group includes, in order from the enlargement conjugate side to the reduction conjugate side, a 21th lens unit with positive refractive power, a 22th lens unit with positive refractive power, and a 23th lens unit with positive refractive power, the 21th lens unit and the 22th lens unit move with a mutual distance changed at the time of zooming, and a condition $$0.1 < fR/fB22 < 3.0$$

is satisfied where fR represents a focal length of the second optical group and fB22 represents a focal length of the 22th lens unit.

Further features of the present invention will become apparent from the following description of exemplary embodiments with reference to the attached drawings.

BRIEF DESCRIPTION OF THE DRAWINGS

FIGS. 1A and 1B are lens cross-sectional views in a wide-angle end and a telephoto end, respectively, in a zoom optical system according to a first exemplary embodiment.

FIGS. 2A and 2B are aberration diagrams in the wide-angle end and the telephoto end, respectively, in the zoom optical system according to the first exemplary embodiment.

FIGS. 3A and 3B are lens cross-sectional views in a wide-angle end and a telephoto end, respectively, in a zoom optical system according to a second exemplary embodiment.

FIGS. 4A and 4B are aberration diagrams in the wide-angle end and the telephoto end, respectively, in the zoom optical system according to the second exemplary embodiment.

FIGS. 5A and 5B are lens cross-sectional views in a wide-angle end and a telephoto end, respectively, in a zoom optical system according to a third exemplary embodiment.

DESCRIPTION OF THE EMBODIMENTS

According to the various embodiments of the present invention, a zoom optical system, which employs a re-imaging method, has a wide viewing angle and high optical performance over an entire zoom range, and can advantageously be formed with a reduced size of the entire zoom lens. At least one embodiment is directed to an image projection apparatus having the zoom optical system. Hereinafter, the zoom optical system according to each exemplary embodiment of the present invention will be described with reference to a corresponding set of drawings. In each exemplary embodiment, the description will be given of a case where the zoom optical system is applied to a zoom optical system used in a projector (image projection apparatus) which projects an original image displayed on an image display device such as a liquid crystal display (LCD) onto an image projection plane (a screen) in an enlarged manner. For simplification, the description will be given assuming that a light flux from the screen (enlargement conjugation point) is re-imaged on the original image (reduction conjugation point) that is a projected image, as an imaging action, while the light flux passes in a direction opposite to that of the projector.

Furthermore, in a case where the zoom optical system is applied to an imaging apparatus such as a digital camera, the object corresponds to the screen side, and a position of the original image corresponds to an imaging surface.

The zoom optical system according to an exemplary embodiment of the present invention includes, in order from an enlargement conjugate side to a reduction conjugate side, a first optical system, and a second optical system having a zoom function. According to the optical action thereof, an image of the enlargement conjugation point on the enlargement conjugate side is formed in an intermediate imaging position (a position of an intermediate image) located between the first and the second optical systems, and the image formed in the intermediate imaging position (intermediate image) is re-formed (reimaged) in the reduction conjugation point on the reduction conjugate side. The second optical system includes, in order from the enlargement conjugate side to the reduction conjugate side, a 21th lens unit with positive refractive power, a 22th lens unit with positive refractive power, and a 23th lens unit with positive refractive power.

At the time of zooming, the 21th lens unit and the 22th lens unit move along loci different from each other. More specifically, the two lens units move individually with a distance therebetween (a distance from the 21th lens unit to the 22th lens unit) changing at the time of zooming (the distance narrowed when moving from a wide-angle end to a telephoto end).

Figure 2B:
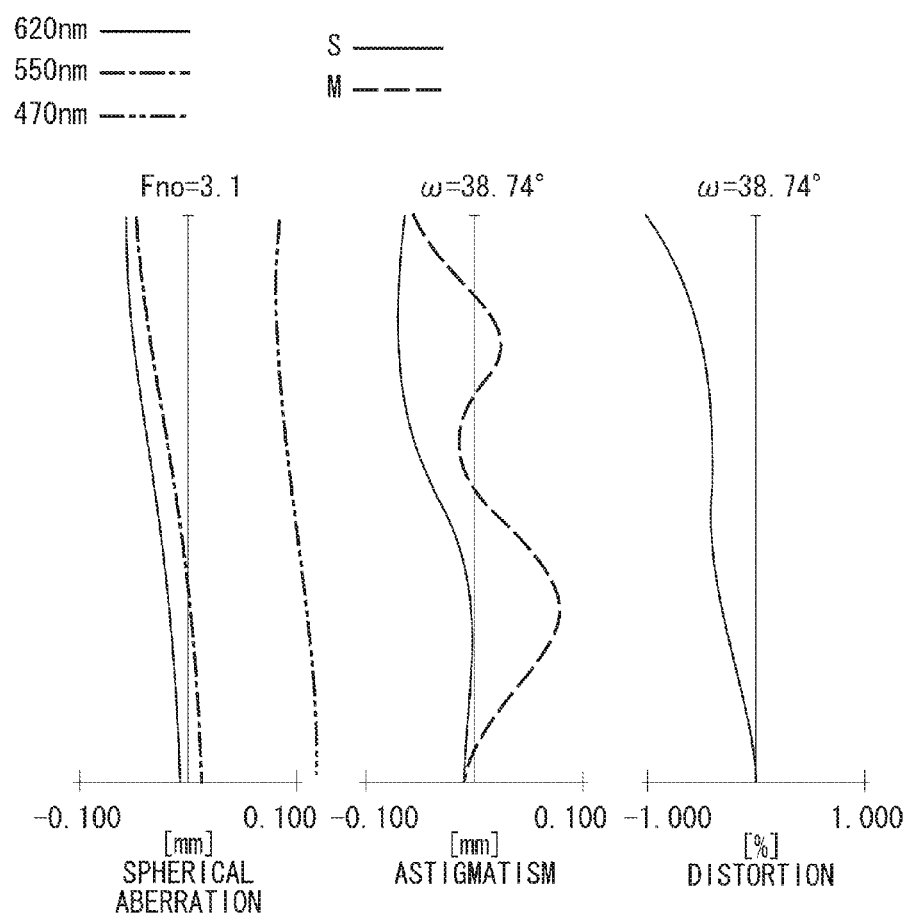

FIGS. 1A and 1B are lens cross-sectional views in a wide-angle end and a telephoto end, respectively in a zoom optical system according to a first exemplary embodiment of the present invention. FIGS. 2A and 2B are aberration diagrams in the wide-angle end and the telephoto end, respectively in a case where a projection distance is 1204 mm in the zoom optical system according to the first exemplary embodiment of the present invention. Here, the projection distance means a distance between an image display device and a projection plane (screen surface) when a numerical example is expressed in units of millimeters (mm) to be described below. This is the same in the following exemplary embodiments.

Figure 4B:
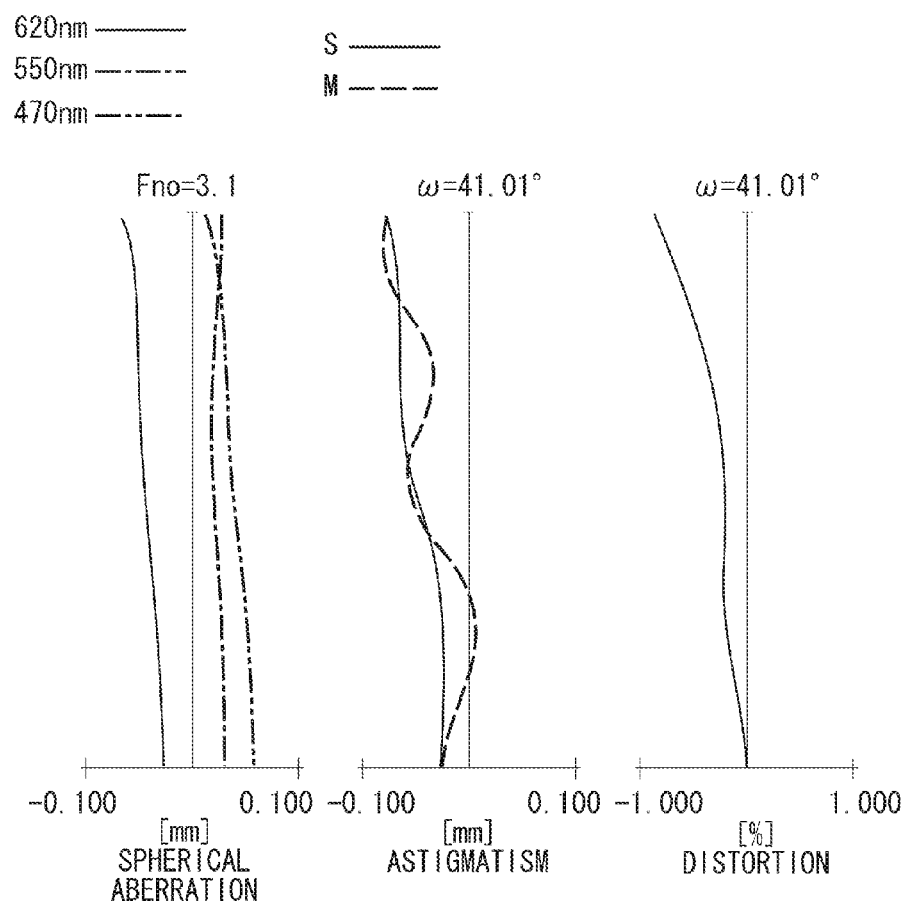
Figure 6A:
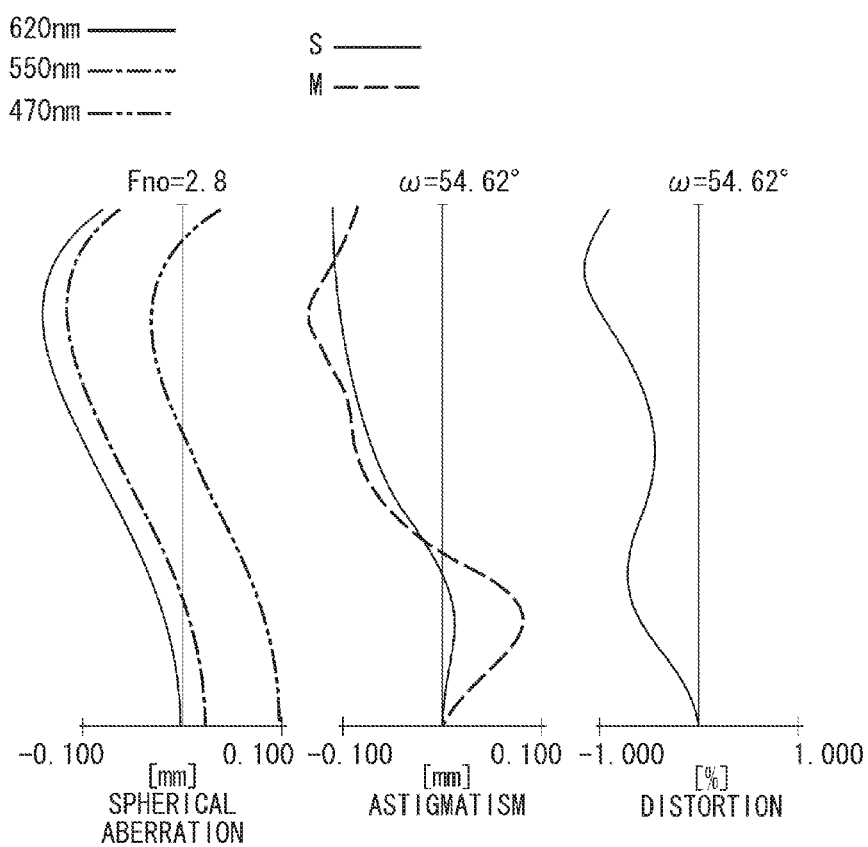
FIGS. 6A and 6B are aberration diagrams in the wide-angle end and the telephoto end, respectively, in the zoom optical system according to the third exemplary embodiment.
Figure 6B:
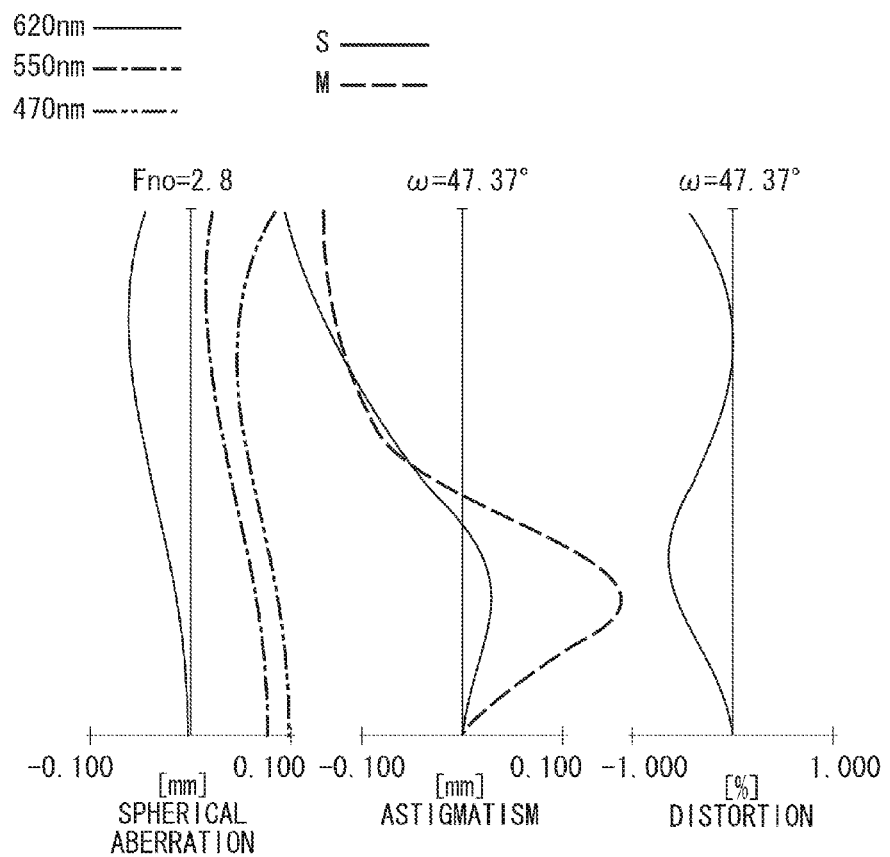
Figure 7:
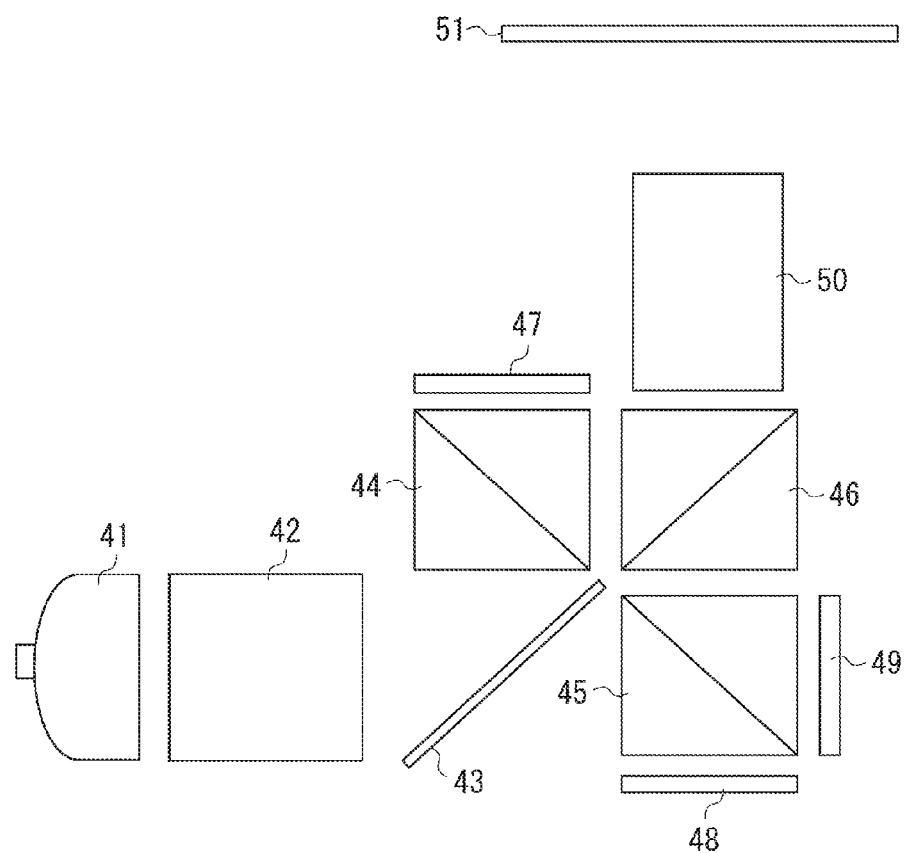
FIG. 7 is a schematic block diagram view of an image projection apparatus according to an exemplary embodiment of the present invention.

FIGS. 3A and 3B are lens cross-sectional views in a wide-angle end and a telephoto end, respectively in a zoom optical system according to a second exemplary embodiment of the present invention. FIGS. 4A and 4B are aberration diagrams in the wide-angle end and the telephoto end, respectively in a case where a projection distance is 1204 mm in the zoom optical system according to the second exemplary embodiment of the present invention. FIGS. 5A and 5B are lens cross-sectional views in a wide-angle end and a telephoto end, respectively in a zoom optical system according to a third exemplary embodiment of the present invention. FIGS. 6A and 6B are aberration diagrams in the wide-angle end and the telephoto end, respectively in a case where a projection distance is 889 mm in the zoom optical system according to the third exemplary embodiment of the present invention. FIG. 7 is a main part schematic view of an image projection apparatus having an imaging optical system according to an exemplary embodiment of the present invention.

The zoom optical system illustrated in each exemplary embodiment includes projection lenses (projection optical system) used in the image projection apparatus (projector). In the lens cross-sectional view, the enlargement conjugate side (screen or front side) is illustrated on the left and is denoted by "S", and the reduction conjugate side (image display element side or rear side) is illustrated on the right. A zoom optical system LA includes an ith optical system Bi wherein i represents an order of the optical system numbered from the enlargement conjugate side. The zoom optical system LA also includes an aperture stop SP, and an original image (image to be projected) IE on a liquid crystal panel (image display device) corresponding to the reduction conjugation point on the reduction conjugate side.

A screen surface S corresponds to the enlargement conjugation plane on the enlargement conjugate side. An image of an enlargement conjugation point is first formed at an intermediate imaging position MI. An arrow next to a lens group indicates a moving direction (moving locus) of each lens unit from the wide-angle end to the telephoto end at the time of zooming.

The aberration diagrams illustrate F-number Fno and half-viewing angle ω (degree). In the spherical aberration diagrams, a two-dot chain line illustrates a wavelength of 470.0 nm, a one-dot chain line illustrates a wavelength of 550 nm, and a solid line illustrates a wavelength of 620 nm. In the astigmatism diagram, a dotted line M illustrates a meridional image plane with a wavelength of 550 nm, and a solid line S shows a sagittal image plane with a wavelength of 550 nm. A distortion aberration diagram illustrates a case where a wavelength is 550 nm. A spherical aberration and an astigmatism are illustrated on a scale of ±0.1 mm, and the distortion aberration is illustrated on a scale of ±1.0%.

The zoom optical system according to each exemplary embodiment includes, in order from the enlargement conjugate side to the reduction conjugate side (left to right when facing the drawings), a first optical system B1, and a second optical system B2 having a zoom function. According to its optical action, an image of the enlargement conjugation point at the screen S on the enlargement conjugate side is formed at the intermediate imaging position MI located between the first optical system B1 and the second optical system B2, and the image formed at the intermediate imaging position MI (intermediate image) is re-formed (reimaged) at the reduction conjugation plane IE on the reduction conjugate side.

The second optical system B2 includes, in order from the enlargement conjugate side to the reduction conjugate side, a 21th lens unit B21 with positive refractive power, a 22th lens unit B22 with positive refractive power, and a 23th lens unit B23 with positive refractive power. At the time of zooming, the 21th lens unit B21 and the 22th lens unit B22 move and the distance therebetween is changed. At this time, a condition is satisfied as follows.

$$0.1 < fR/fB22 < 3.0 \quad (1)$$

wherein fR represents a focal length of the second optical system B2 in the wide-angle end, and fB22 represents a focal length of the 22th lens unit B22.

The condition (1) expresses a relationship between the focal length of the second optical system B2 in the wide-angle end, and the focal length of the 22th lens unit B22. When the value falls below the lower limit of the condition (1), the refractive power of the 22th lens unit B22 becomes extremely weak in the second optical system B2, and a zoom function is lowered in the 22th lens unit B22. On the other hand, when the value exceeds the upper limit, the refractive power of the 22th lens unit B22 becomes extremely strong in the second optical system B2, and an axial chromatic aberration and a spherical aberration considerably vary at the time of zooming. Thus, the numerical value range of the condition (1) can be set as follows.

$$0.1 < fR/fB22 < 2.8 \quad (1a)$$

Furthermore, at least one of the following conditions is to be further satisfied in each exemplary embodiment. That is, the conditions are as follows.

$$0.1 < |fW/fB22| < 0.3 \quad (2)$$

$$0.1 < fB23/fB22 < 1.0 \quad (3)$$

wherein fW represents a focal length of the entire zoom lens (the zoom lens including the first and second optical systems) in the wide-angle end, and fB23 represents a focal length of the 23th lens unit B23.

Next, technical meaning of the above conditions will be described.

The condition (2) expresses a relationship between the focal length of the entire zoom lens in the wide-angle end, and the focal length of the 22th lens unit B22. When the value falls below the lower limit of the condition (2), moving distances of the 21th lens unit B21 and the 22th lens unit B22 are increased at the time of zooming, and there is a large change in height of an off-axis ray incident to the 21th lens unit B21 and the 22th lens unit B22. As a result, the distortion aberration and the curvature of field considerably vary at the time of zooming. On the other hand, when the value exceeds the upper limit, the refractive power of the 22th lens unit B22 becomes excessively strong, and the axial chromatic aberration and the spherical aberration considerably vary at the time of zooming.

The condition (3) expresses a relationship between the focal lengths of the 22th lens unit B22 and the 23th lens unit B23. When the value falls below the lower limit of the condition (3), the refractive power of the 22th lens unit B22 becomes extremely weak, and the curvature of field and the distortion aberration are increased, so that it becomes difficult to correct these aberrations. On the other hand, when the value exceeds the upper limit, the spherical aberration and the axial chromatic aberration are increased. The numerical value range of the conditions (2) and (3) can be set as follows.

$$0.13 < |fW/fB22| < 0.25 \quad (2a)$$

$$0.50 < fB23/fB22 < 0.96 \quad (3a)$$

As described above, in the zoom optical system according to each exemplary embodiment, the viewing angle is wide, the number of lens units movable at the time of zooming is small, and aberrations such as distortion and curvature of field can be favorably corrected anywhere from the wide-angle end to the telephoto end of the zooming range.

In addition, to successfully correct the aberrations, it is desirable that the 21st lens unit B21 has at least one negative lens, and the 22nd lens unit B22 has the aperture stop SP between the lenses. Furthermore, to reduce the aberration variation at the time of zooming, it is desirable that the 21st lens unit B21 moves toward the reduction conjugate side, and the 22nd lens unit B22 moves toward the enlargement conjugate side at the time of zooming from the wide-angle end to the telephoto end. To reduce the aberration variation at the time of focusing, it is desirable that the first optical system B1 moves at least partially (or entirely) at the time of focusing.

Next, a lens configuration in each exemplary embodiment will be described.

Hereinafter, the lenses included in the zoom optical system are sequentially referred to as a 1st lens and a 2nd lens arranged from the enlargement conjugate side (object side) to the reduction conjugate side (image side). The zoom optical system according to the first exemplary embodiment has 20 lenses in total. The first optical system B1 includes the 1st lens to a 9th lens. The second optical system B2 includes a 10th lens to a 20th lens. The intermediate real image MI is formed between the 9th lens G9 and the 10th lens G10.

Furthermore, the second optical system B2 has the lens units moving at the time of zooming. The second optical system B2 includes the 21th lens unit B21 with positive refractive power, the 22th lens unit B22 with positive refractive power, and the 23th lens unit B23 with positive refractive power, in order from the enlargement conjugate side. At the time of zooming from the wide-angle end to the telephoto end, the 21th lens unit B21 moves to the reduction conjugate side, and the 22th lens unit B22 moves to the enlargement conjugate side. In the entire zoom range, telecentricity is maintained between a final lens surface of the second optical system B2 and a reduction conjugate surface.

Each of the lens units in the second optical system B2 has the positive refractive power. Therefore, the spherical aberration can be successively corrected by arranging the negative lens in each of the 21th lens unit B21 and the 22th lens unit B22. When the 21th lens unit B21 moves at the time of zooming, a height of an incident axial ray changes and the spherical aberration varies, so that the negative lens is arranged to correct them.

Furthermore, a negative distortion aberration (pincushion on the enlargement conjugate side) generated from the first optical system B1 is also corrected by the negative lens at the same time. As for the 22th lens unit B22, the refractive power is arranged in a roughly symmetric manner across the aperture stop SP, which prevents the distortion aberration from being generated from the 22th lens unit B22.

A lateral magnification of the second optical system B2 is set to be roughly the same magnification in the telephoto end. As a first reason for it, in a case where the image of the reduction conjugate surface side of the second optical system B2 is enlarged in the telephoto end with respect to the intermediate real image MI, the axial chromatic aberration in the intermediate real image MI is enlarged by the square of the lateral magnification in the reduction conjugate surface. Therefore, the axial chromatic aberration is increased. As a second reason for it, in a case where the image of the reduction conjugate surface side is reduced with respect to the intermediate real image MI in the telephoto end, the height of the off-axis ray input to the intermediate real image MI is increased, and the lens system near the intermediate real image MI is enlarged, which causes a problem.

Furthermore, as for the second optical system B2, at the time of zooming, the focal length of the stationary 23th lens unit B23 is reduced to the shortest length in the second optical system B2, and the refractive powers of the 21th lens unit B21 and the 22th lens unit B22 serving as the moving lens units are weakened. As a result, the spherical aberration variation and the distortion aberration variation are reduced at the time of zooming. The conditions (1) to (3) define the favorable refractive power range of each lens unit in this case.

According to a second exemplary embodiment, the first optical system B1 includes the 1st lens to an 11th lens. The second optical system B2 includes a 12th lens to the 24th lens. The intermediate real image MI is formed between the 11th lens G11 and the 12th lens G12. The number of the lens units of the second optical system B2, the refractive power, and the zooming method are the same as those of the first exemplary embodiment. According to the second exemplary embodiment, a zoom ratio is 1.2 while it is 1.3 in the first exemplary embodiment. According to the second exemplary embodiment, similar to the first exemplary embodiment, the telecentricity is maintained between the final lens surface of the second optical system and the reduction conjugate surface, in both of the wide-angle end and the telephoto end at the time of zooming.

According to a third exemplary embodiment, the first optical system B1 includes the 1st lens to the 10th lens. The second optical system B2 includes the 11th lens to a 21th lens. The intermediate real image MI is formed between the 10th lens G10 and the 11th lens G11. The number of the lenses of the second optical system B2, the refractive power, and the zooming method are the same as those of the first exemplary embodiment. According to the third exemplary embodiment, a distance between the enlargement conjugate surface and the 1st lens is shorter than that of the first exemplary embodiment. Similar to the first exemplary embodiment, the telecentricity is maintained between the final lens surface of the second optical system and the reduction conjugate surface, in both of the wide-angle end and the telephoto end at the time of zooming.

Next, a description will be given to an exemplary embodiment in FIG. 7 in which the zoom optical system according to an exemplary embodiment of the present invention is applied to a projection optical system used in an image projection apparatus. A light source 41 is illustrated in FIG. 7. A lighting optical system 42 evenly illuminates an image display element and has a function of aligning a polarization direction of the emitted light with that of a P-polarized light or S-polarized light. A color separation optical system 43 separates the light from the lighting optical system 42 into rays each having a certain color suitable for the image display element.

Image display elements 47, 48, and 49 including a reflective type liquid crystal display (LCD) each modulate the incident polarized light based on an electric signal and form an image. Polarization beam splitters 44 and 45 transmit or reflect the light according to the modulation by the image display elements 47, 48, and 49. A color synthesis optical system 46 synthesizes the lights from the image display elements 47, 48, and 49 into one light. A projection optical system 50 projects the light synthesized by the color synthesis optical system 46 to a projection target (projection plane), such as a screen, 51.

The zoom optical system according to an exemplary embodiment of the present invention is used in the projection optical system 50. Thus, according to the image projection apparatus, changes in aberrations can be successively corrected in a wide projection distance range, and its optical performance is excellent over the entire screen.

The exemplary embodiments of the present invention have been described above, but the present invention is not limited to the above described exemplary embodiments, and can be variously modified within a range of its scope.

Next, a numerical example of the zoom optical system according to each exemplary embodiment is illustrated. A surface number of the lens configuration in the numerical example is given to each of the lens surfaces in order from the enlargement conjugate side to the reduction conjugate side. Furthermore, a curvature radius R of each lens surface, and a distance on an optical axis (physical distance) d between a lens surface i and a lens surface (i+1) are illustrated. A surface having "STO" on the right side of the surface number is the aperture stop. In addition, a refractive index nd and an Abbe's number vd are indexes to the d line in a material of each lens. Furthermore, the focal length of the entire zoom lens, the aperture ratio (F number), and the half viewing angle ω are illustrated in each numerical example.

In addition, in each numerical example, the value of the focal length of the entire zoom lens in the wide-angle end is negative. Because the conjugation point is formed in the lens unit, so that the image in the final image plane is an erected image. Therefore, the focal length of the entire zoom lens becomes the negative value depending on the definition. However, the refractive power of the entire zoom lens is positive.

The lens surface having * (asterisk) on the right side of the surface number is in an aspheric shape according to the following function. The aspheric shape is expressed by $$x=(y^2/R)/[1+\{1-(1+K)(y^2/R^2)\}^{1/2}]+Ay^4+By^6+Cy^8+Dy^{10}$$

wherein the x-axis extends along an optical axis, the y-axis is perpendicular to the optical axis, a travelling direction of the light is positive, R represents a paraxial curvature radius, K represents a conic constant, A, B, C, and D represent aspheric coefficients, and notation E-X is $10^{-x}$.

Furthermore, Table 1 shows a relationship between the above exemplary embodiments and numerical values.

Numerical Example 1

| Surface number | R [mm] | d [mm] | nd | υd |
|---|---|---|---|---|
| obj | ∞ | 1204 | | |
| 1* | 150.421 | 2.800 | 1.487 | 70.23 |
| 2 | 19.992 | 5.666 | | |
| 3* | 19.569 | 2.108 | 1.762 | 26.52 |
| 4 | 16.853 | 10.545 | | |
| 5 | −41.019 | 0.700 | 1.487 | 70.23 |
| 6 | 27.431 | 3.000 | | |
| 7 | 37.089 | 7.337 | 1.835 | 42.73 |
| 8 | −36.653 | 18.634 | | |
| 9 | 135.681 | 3.877 | 1.713 | 53.87 |
| 10 | −12.000 | 0.700 | 1.762 | 26.52 |
| 11 | −42.605 | 7.154 | | |
| 12 | 116.771 | 0.852 | 1.755 | 27.51 |
| 13 | 32.429 | 1.948 | | |
| 14 | 104.561 | 3.798 | 1.755 | 52.32 |
| 15 | −38.697 | 16.077 | | |
| 16 | 57.511 | 4.761 | 1.651 | 56.16 |
| 17 | −659.653 | Variable | | |
| 18 | 50.095 | 7.248 | 1.762 | 26.52 |
| 19 | −158.093 | 11.488 | | |
| 20 | −31.977 | 0.926 | 1.808 | 22.76 |
| 21 | −834.341 | 4.775 | | |
| 22 | −95.142 | 8.048 | 1.762 | 26.52 |
| 23 | −37.231 | Variable | | |
| 24* | 86.306 | 5.158 | 1.800 | 42.22 |
| 25 | −191.918 | 13.629 | | |
| 26 | 26.547 | 3.954 | 1.788 | 47.37 |
| 27 | 57.698 | 0.664 | | |
| 28 | 18.469 | 6.737 | 1.651 | 56.16 |
| 29 | 95.036 | 0.500 | | |
| 30 | 63.454 | 1.727 | 1.808 | 22.76 |
| 31 | 10.685 | 5.754 | | |
| 32 | (STO) | 0.000 | 5.432 | |
| 33 | −10.153 | 1.182 | 1.808 | 22.76 |
| 34 | −91.353 | 3.438 | | |
| 35 | −31.916 | 5.300 | 1.816 | 46.62 |
| 36 | −20.608 | 3.243 | | |
| 37 | −218.589 | 6.521 | 1.772 | 49.6 |
| 38* | −23.497 | Variable | | |
| 39 | 52.135 | 4.241 | 1.772 | 49.6 |
| 40 | 361.070 | 40.000 | 0.000 | 1 |
| im | ∞ | | | |

| f (Wide-angle end) [mm] | FNO (Wide-angle end) | FNO (Telephoto end) | Maximum half viewing angle [deg] | Zoom ratio |
|---|---|---|---|---|
| −12.483 | 2.795 | 3.060 | 46.204 | 1.3 |

| Surface number | K | A | B | C | D |
|---|---|---|---|---|---|
| 1 | 0 | 3.3292E−05 | −7.0158E−08 | 1.2068E−10 | −9.9806E−14 |
| 3 | 0 | −3.9589E−05 | 6.3132E−09 | −1.4512E−10 | 3.0841E−13 |
| 24 | 0 | 6.5477E−07 | −2.6048E−10 | 1.0455E−13 | −2.2608E−16 |
| 38 | 0 | 3.1938E−06 | 4.8112E−09 | 2.5426E−12 | 3.2830E−14 |

| Surface number | d [mm] (Wide-angle end) | d [mm] (Telephoto end) |
|---|---|---|
| 17 | 15.684 | 23.479 |
| 23 | 28.135 | 5.170 |
| 38 | 0.500 | 15.671 |

Numerical Example 2

| Surface number | R [mm] | d [mm] | nd | υd |
|---|---|---|---|---|
| obj | ∞ | 1204 | | |
| 1* | 72.186 | 2.800 | 1.516 | 64.14 |
| 2 | 19.948 | 4.437 | | |
| 3* | 19.860 | 2.000 | 1.772 | 49.6 |
| 4 | 16.975 | 10.541 | | |
| 5 | −44.477 | 0.700 | 1.497 | 81.54 |
| 6 | 20.994 | 2.977 | | |
| 7 | 42.960 | 7.234 | 1.835 | 42.73 |
| 8 | −41.162 | 4.714 | | |
| 9 | 18.506 | 4.205 | 1.755 | 52.32 |
| 10 | −78.206 | 0.500 | | |
| 11 | −295.881 | 0.700 | 1.762 | 26.52 |
| 12 | 11.892 | 9.106 | | |
| 13 | 56.973 | 5.363 | 1.755 | 52.32 |
| 14 | −12.000 | 0.700 | 1.762 | 26.52 |
| 15 | −24.812 | 2.065 | | |
| 16 | 596.995 | 0.700 | 1.755 | 27.51 |
| 17 | 26.400 | 1.963 | | |
| 18 | 142.398 | 3.354 | 1.755 | 52.32 |
| 19 | −35.358 | 20.433 | | |
| 20 | 60.596 | 5.555 | 1.808 | 22.76 |
| 21 | −108.081 | Variable | | |
| 22 | 93.205 | 1.952 | 1.762 | 26.52 |
| 23 | 120.974 | 6.915 | | |
| 24 | −43.377 | 1.200 | 1.678 | 55.34 |
| 25 | −350.336 | 3.521 | | |
| 26 | −296.503 | 5.698 | 1.762 | 40.1 |
| 27 | −48.924 | Variable | | |
| 28 | 384.040 | 5.642 | 1.678 | 55.34 |
| 29 | −58.862 | 1.064 | | |
| 30 | 34.645 | 3.799 | 1.762 | 26.52 |
| 31 | 59.975 | 0.500 | | |
| 32 | 17.493 | 7.880 | 1.595 | 67.74 |
| 33 | 119.316 | 0.652 | | |
| 34 | 130.173 | 0.966 | 1.626 | 35.7 |
| 35 | 12.348 | 12.925 | | |
| 36 | (STO) | 0.000 | 3.039 | |
| 37 | −12.831 | 0.700 | 1.762 | 26.52 |
| 38 | 45.488 | 0.500 | | |
| 39 | 28.783 | 3.479 | 1.595 | 67.74 |
| 40 | −13.635 | 8.282 | | |
| 41 | −10.036 | 0.700 | 1.626 | 35.7 |
| 42 | 1510.153 | 2.001 | | |
| 43 | −38.332 | 3.550 | 1.835 | 42.73 |
| 44 | −21.008 | 0.500 | | |
| 45 | −183.790 | 6.374 | 1.835 | 42.73 |
| 46 | −23.745 | Variable | | |
| 47 | 75.054 | 3.897 | 1.835 | 42.73 |
| im | ∞ | 40 | | |

| f (Wide-angle end) [mm] | FNO (Wide-angle end) | FNO (Telephoto end) | Maximum half viewing angle [deg] | Zoom ratio |
|---|---|---|---|---|
| −12.483 | 2.800 | 3.060 | 46.204 | 1.2 |

| Surface number | K | A | B | C | D |
|---|---|---|---|---|---|
| 1 | 0 | 3.2503E−05 | −6.5962E−08 | 1.3254E−10 | −1.1921E−13 |
| 3 | 0 | −3.3691E−05 | 3.5281E−08 | −1.4742E−10 | 1.8871E−13 |

| Surface number | d [mm] (Wide-angle end) | d [mm] (Telephoto end) |
|---|---|---|
| S21 | 18.207 | 36.301 |
| S27 | 39.408 | 5.170 |
| S46 | 0.500 | 15.671 |

-continued (Numerical example 3)

| Surface number | R [mm] | d [mm] | nd | νd |
|---|---|---|---|---|
| obj | ∞ | 889 | | |
| 1* | 35.369 | 0.774 | 1.487 | 70.23 |
| 2* | 17.369 | 4.423 | | |
| 3* | 21.179 | 0.850 | 1.835 | 42.73 |
| 4* | 10.784 | 11.841 | | |
| 5 | −29.007 | 0.650 | 1.835 | 42.73 |
| 6 | 30.813 | 2.064 | | |
| 7 | 267.289 | 4.540 | 1.762 | 26.52 |
| 8 | −30.978 | 3.561 | | |
| 9 | 62.244 | 2.861 | 1.808 | 22.76 |
| 10 | −92.345 | 11.421 | | |
| 11 | 22.885 | 3.036 | 1.487 | 70.23 |
| 12 | −46.171 | 1.500 | | |
| 13 | 82.795 | 0.650 | 1.762 | 26.52 |
| 14 | 13.218 | 0.572 | | |
| 15 | 13.872 | 3.536 | 1.487 | 70.23 |
| 16 | −32.804 | 17.959 | | |
| 17 | −11.188 | 0.953 | 1.487 | 70.23 |
| 18 | −16.906 | 5.985 | | |
| 19 | 32.560 | 7.812 | 1.487 | 70.23 |
| 20* | −30.052 | Variable | | |
| 21 | 49.177 | 8.201 | 1.734 | 51.47 |
| 22 | −100.943 | 0.500 | | |
| 23 | 52.372 | 4.867 | 1.804 | 46.58 |
| 24 | 4915.533 | 2.478 | | |
| 25 | −81.074 | 0.650 | 1.689 | 31.07 |
| 26 | 28.796 | 0.500 | | |
| 27 | 20.391 | 3.728 | 1.755 | 52.32 |
| 28 | 18.790 | Variable | | |
| 29 | 33.192 | 5.329 | 1.755 | 52.32 |
| 30 | −181.901 | 0.500 | | |
| 31 | 41.472 | 3.896 | 1.801 | 34.97 |
| 32 | −179.759 | 0.843 | | |
| 33 | −90.214 | 0.650 | 1.808 | 22.76 |
| 34 | 64.075 | 16.976 | | |
| 35 | (STO) | 0.000 | 7.043 | |
| 36 | −10.693 | 0.747 | 1.808 | 22.76 |
| 37 | 1883.106 | 1.419 | | |
| 38 | −191.842 | 13.270 | 1.755 | 52.32 |
| 39 | −19.615 | Variable | | |
| 40 | 227.387 | 3.636 | 1.755 | 52.32 |
| 41 | −85.982 | 0.500 | | |
| 42 | 48.688 | 3.753 | 1.755 | 52.32 |
| im | ∞ | 40 | | |

| f (Wide-angle end) [mm] | FNO (Wide-angle end) | FNO (Telephoto end) | Maximum half viewing angle [deg] | Zoom ratio |
|---|---|---|---|---|
| −9.214 | 2.784 | 2.784 | 54.622 | 1.3 |

| Surface number | K | A | B | C | D |
|---|---|---|---|---|---|
| 1 | 0 | 5.0686E−05 | −4.7273E−08 | 6.8300E−11 | −2.3234E−14 |
| 2 | 0 | 4.11008E−05 | 2.0636E−08 | 1.1054E−09 | −5.8929E−12 |
| 3 | 0 | 2.1789E−05 | −7.2106E−08 | 4.4582E−11 | 1.6739E−12 |
| 4 | 0 | 2.6836E−05 | −7.2885E−07 | 4.8972E−09 | −2.2340E−11 |
| 20 | 0 | 6.8036E−05 | −2.1694E−07 | 5.5164E−10 | −5.4511E−13 |

| Surface number | d [mm] (Wide-angle end) | d [mm] (Telephoto end) |
|---|---|---|
| S20 | 22.465 | 42.237 |
| S28 | 34.449 | 14.336 |
| S39 | 8.614 | 8.877 |

TABLE 1

| Condition | Numerical example | | |
|---|---|---|---|
| | 1 | 2 | 3 |
| (1) fR/fB22 | 1.617 | 2.027 | 2.588 |
| (2) \| fW/fB22 \| | 0.150 | 0.152 | 0.185 |
| (3) fB23/fB22 | 0.938 | 0.931 | 0.851 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-029397 filed Feb. 19, 2014, which is hereby incorporated by reference herein in its entirety.

What is claimed is:

1. A zoom optical system comprising, in order from an enlargement conjugate side to a reduction conjugate side:
a first optical group; and
a second optical group having a zoom function,
wherein the zoom optical system is configured to conjugate an enlargement conjugation point on the enlargement conjugate side with an intermediate imaging position located between the first optical group and the second optical group, and to conjugate the intermediate imaging position with a reduction conjugation point on the reduction conjugate side,
wherein the second optical group includes, in order from the enlargement conjugate side to the reduction conjugate side, a lens unit B21 with positive refractive power, a lens unit B22 with positive refractive power, and a lens unit B23 with positive refractive power, and
wherein the lens unit B21 and the lens unit B22 are configured to move during a zooming operation, such that a distance between the lens unit B21 and the lens unit B22 is changed and a condition $0.1 < fR/fB22 < 3.0$ is satisfied, where fR represents a focal length of the second optical group in a wide-angle end, and fB22 represents a focal length of the lens unit B22.

2. The zoom optical system according to claim 1, wherein the lens unit B21 has at least one negative lens, and the lens unit B22 has an aperture stop between a lens arranged at a position closest to the enlargement conjugate side among the lens unit B22 and a lens arranged at a position closest to the reduction conjugate side among the lens unit B22.

3. The zoom optical system according to claim 1, wherein a condition $0.1 < |fW/fB22| < 0.3$ is satisfied, where fW represents a focal length of the zoom optical system in the wide-angle end.

4. The zoom optical system according to claim 1, wherein a condition $0.1 < fB23/fB22 < 1.0$ is satisfied, where fB23 represents a focal length of the lens unit B23.

5. The zoom optical system according to claim 1, wherein the lens unit B21 is configured to move to the reduction conjugate side, and the lens unit B22 is configured to move to the enlargement conjugate side, when zooming from the wide-angle end to a telephoto end.

6. The zoom optical system according to claim 1, wherein the first optical group is configured to move at least partially during a focusing operation.

7. An image projection apparatus comprising:
an image display element configured to form an original image; and
a zoom optical system configured to project a light flux from the image display element to a projection plane,
wherein the zoom optical system comprises, in order from a projection plane side to an image display element side:
a first optical group; and
a second optical group having a zoom function,
wherein the zoom optical system is configured to conjugate an enlargement conjugation point from the projection plane with an intermediate imaging position located between the first optical group and the second optical group, and to conjugate the intermediate imaging position with a reduction conjugation point on the image display element,
wherein the second optical group includes, in order from the projection plane side to the image display element side, a lens unit B21 with positive refractive power, a lens unit B22 with positive refractive power, and a lens unit B23 with positive refractive power, and
wherein the lens unit B21 and the lens unit B22 are configured to move during a zooming operation, such that a distance between the lens unit B21 and the lens unit B22 is changed and a condition $0.1 < fR/fB22 < 3.0$ is satisfied, where fR represents a focal length of the second optical group in a wide-angle end, and fB22 represents a focal length of the lens unit B22.

8. An optical system comprising: in order from an enlargement conjugate side to a reduction conjugate side:
a first optical group having a focus function; and
a second optical group having a zoom function,
wherein the optical system is configured to project an original image formed on an image display device onto an intermediate image plane located between the first optical group and the second optical group, and to project an intermediate image formed at the intermediate image plane onto an image projection plane,
wherein the second optical group includes, in order from the image projection plane to the intermediate image plane, a first lens unit with positive refractive power, a second lens unit with positive refractive power, and a third lens unit with positive refractive power,
wherein the first lens unit and the second lens unit are configured to move in different directions during zooming from a wide-angle end to a telephoto end, and
wherein a distance between the first lens unit and the second lens unit changes during the zooming, such that a condition $0.1 < fR/fB22 < 3.0$ is satisfied, where fR represents a focal length of the second optical group at the wide-angle end, and fB22 represents a focal length of the second lens unit.

9. An image projection apparatus comprising:
an image display element configured to form an original image; and
an optical system configured to project a light flux from the image display element to a projection plane,
wherein the optical system comprises, in order from a side of the projection plane to a side of the image display element:
a first optical group having a focus function; and
a second optical group having a zoom function,
wherein the optical system is configured to project the original image formed on the image display element onto an intermediate image plane located between the first optical group and the second optical group, and to project an intermediate image formed at the intermediate image plane onto an image projection plane, wherein the second optical group includes, in order from the image projection plane to the intermediate image plane, a first lens unit with positive refractive power, a second lens unit with positive refractive power, and a third lens unit with positive refractive power, wherein the first lens unit and the second lens unit are configured to move in different directions during zooming from a wide-angle end to a telephoto end, and wherein a distance between the first lens unit and the second lens unit changes during the zooming, such that a condition $$0.1 < fR/fB22 < 3.0$$

is satisfied, where fR represents a focal length of the second optical group at the wide-angle end, and fB22 represents a focal length of the second lens unit.

10. The zoom optical system according to claim 1, wherein the second optical group consists of the lens unit B21, the lens unit B22, and the lens unit B23 in order from the enlargement conjugate side to the reduction conjugate side.

* * * * *